Figure 1:
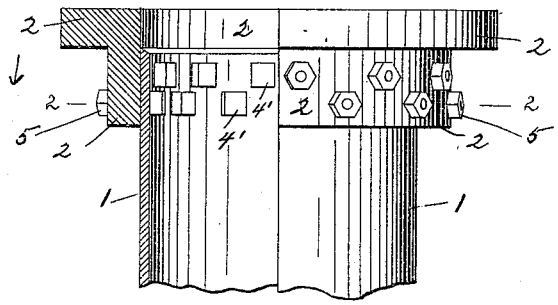

(No Model.)

G. H. WEBB.
STEAM PIPE FITTING.

No. 544,147.  Patented Aug. 6, 1895.

Witnesses
A. C. Whiting
M. J. Galvin

Inventor
George H. Webb.
By his Attorney
John C. Dewey

UNITED STATES PATENT OFFICE.

GEORGE H. WEBB, OF PAWTUCKET, RHODE ISLAND.

STEAM-PIPE FITTING.

SPECIFICATION forming part of Letters Patent No. 544,147, dated August 6, 1895.

Application filed December 7, 1894. Serial No. 531,097. (No model.)

*To all whom it may concern:*

Be it known that I, GEORGE H. WEBB, a citizen of the United States, residing at Pawtucket, in the county of Providence and State of Rhode Island, have invented certain new and useful Improvements in Steam-Pipe Fittings; and I do hereby declare that the following is a full, clear, and exact description of the invention, which, in connection with the drawings making a part of this specification, will enable others skilled in the art to which my invention belongs to make and use the same.

My invention relates to pipe-fittings, and particularly to steam-pipe fittings in which the pipe, ordinarily of wrought metal, is fitted up with a flange of cast-iron. The flange has to be secured on the end of the pipe in such a way as to make a steam-tight joint, and heretofore this has ordinarily been done by riveting. The head of the rivet is put on the outside of the flange and the riveting is done on the inside of the pipe, and this is done because a steam-tight joint cannot be made under the rivet-head. After the flange is riveted on the pipe, as above described, the end of the pipe within the flange is calked to make a steam-tight joint. Sometimes wrought-steel flanges are used instead of cast-iron flanges, as mentioned above, and in that case the rivet-head can be put on the inside of the pipe and the riveting done on the outside of the flange, and the joint inside the flange, and also the joint outside, can both be calked, as the wrought-steel flange can be made much thinner than the cast-iron flange, which will permit of calking both joints to make them steam-tight.

The operation above described of riveting the flange to the pipe is expensive and requires experienced boiler-makers to do it properly.

The object of my invention is to do away with the riveting of the flange to the pipe in steam-pipe fitting, and to provide an improved method or way of fitting or securing the flange of cast-iron or wrought-steel to the wrought-metal pipe to make a steam-tight joint. I have discovered that I can fit a cast-iron flange to a wrought-metal pipe with bolts and make a steam-tight joint under the head of the bolt which is on the inside of the pipe.

In carrying out my invention I drill a series of cylindrical holes through the flange and the pipe. I then take bolts, which for a portion of their length just below the head are made tapering, the length of the taper portion corresponding to the thickness of the wrought-metal pipe with which they are to be used. These bolts are inserted in the cylindrical holes in the pipe and flange, with their heads on the inside of the pipe. The nuts are screwed on to the threaded ends of the bolts on the outside of the flange. The screwing up of the nut draws the taper portion of the bolt under the head into the cylindrical hole in the pipe, the wrought metal of which yields and fits itself around the bolt and under the head to make a steam-tight joint.

I have shown in the drawings a detached portion of a wrought-metal pipe fitted with a flange by my improved method above described.

Figure 2:
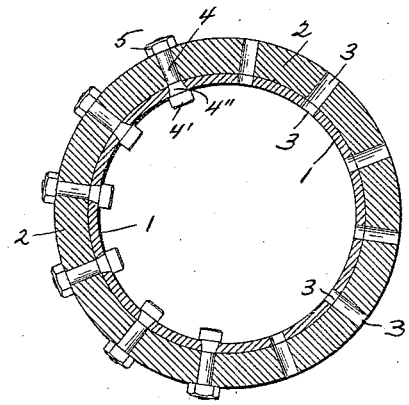
Figure 3:
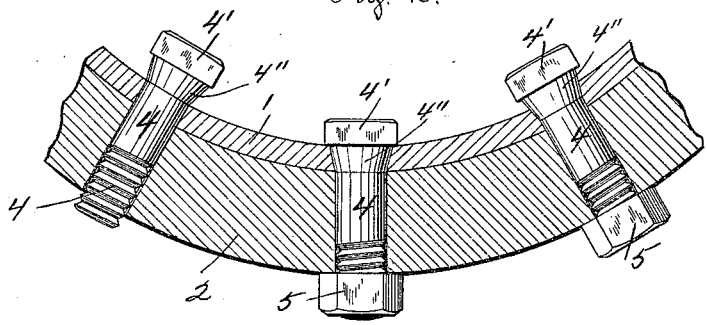

Referring to the drawings, Figure 1 is an elevation or side view of the end of a wrought-metal pipe with a flange fitted or secured thereto by my improved method. A portion of the pipe and flange is cut out to show the interior thereof. Fig. 2 is a cross-section through the flange and pipe shown in Fig. 1, taken at a point indicated by line 2 2, same figure. Some of the bolts are left out in this figure. Fig. 3 is, on an enlarged scale, a sectional detail of the pipe and flange, showing different positions of the attaching-bolts.

In the accompanying drawings, 1 is a section of wrought-metal pipe, preferably wrought-iron pipe, such as is used in steam-fittings.

2 is a flange of metal, preferably cast-iron, which is adapted to fit over or on the end of the pipe 1, as shown in Fig. 1. A series of cylindrical holes 3 are drilled through the flange 2 and pipe 1, as shown in Figs. 1 and 2. Bolts 4 are inserted in the holes 3 with the heads 4' on the inside of the pipe. Each bolt 4 is made with a taper portion 4'' just below the head 4', and the length of this taper portion corresponds to the thickness of the pipe 1. (See Fig. 3.) The diameter of the taper portion 4'' of the bolt 4 is a little greater than the diameter of the cylindrical hole 3 in the pipe, while the diameter of the rest of the bolt corresponds to the diameter of the cylindrical hole 3 in the flange—that is, if the hole 3 is drilled with a three-quarter-inch drill, a three-quarter-inch bolt is used.

After the bolts 4 are inserted in the cylindrical holes 3, from the inside of the pipe 1, the nuts 5 are screwed onto the threaded ends thereof. The screwing up of the nut 5 on the bolt 4 will draw the taper portion 4" into the cylindrical hole 3 in the wrought-metal pipe 1 and cause the metal to yield around said taper portion, and to fit or compress itself around the bolt under the head 4' thereof and make a steam-tight joint under the head of the bolt. (See Fig. 3.)

The advantages of my improvements in pipe-fitting will be readily appreciated by those skilled in the art.

The pipes may be fitted with the flanges in any ordinary machine-shop in which there is a drill for boring the cylindrical holes through the pipe and flange by an ordinary mechanic, who will use, for securing the flange to the pipe, bolts having a taper portion under the head thereof, as shown in the drawings and above described.

Having thus described my invention, what I claim as new, and desire to secure by Letters Patent, is—

The combination with wrought metal pipe, and a metal flange, said pipe and flange provided with a series of cylindrical holes therein, of bolts provided with a taper portion below the head thereof, said bolts adapted to be inserted from the inside of the pipe, the material of the pipe being compressed around the bolt and the taper portion thereof drawn into the cylindrical holes in the pipe, to make a steam-tight joint under the head of the bolt, by screwing up the nuts on the ends of the bolts, substantially as set forth.

GEORGE H. WEBB.

Witnesses:
J. F. BROWNING,
DEXTER S. LUTHER.